No. 750,667. PATENTED JAN. 26, 1904.
O. I. LEWELLYN & J. W. SCHOCK.
VACUUM FRAME.
APPLICATION FILED AUG. 24, 1903.
NO MODEL. 2 SHEETS—SHEET 1.

Witnesses
R. P. King
N. H. Allemong

Inventors
Oscar I. Lewellyn
James W. Schock
By V. H. Lockwood
Attorney

No. 750,667. PATENTED JAN. 26, 1904.
O. I. LEWELLYN & J. W. SCHOCK.
VACUUM FRAME.
APPLICATION FILED AUG. 24, 1903.
NO MODEL. 2 SHEETS—SHEET 2.
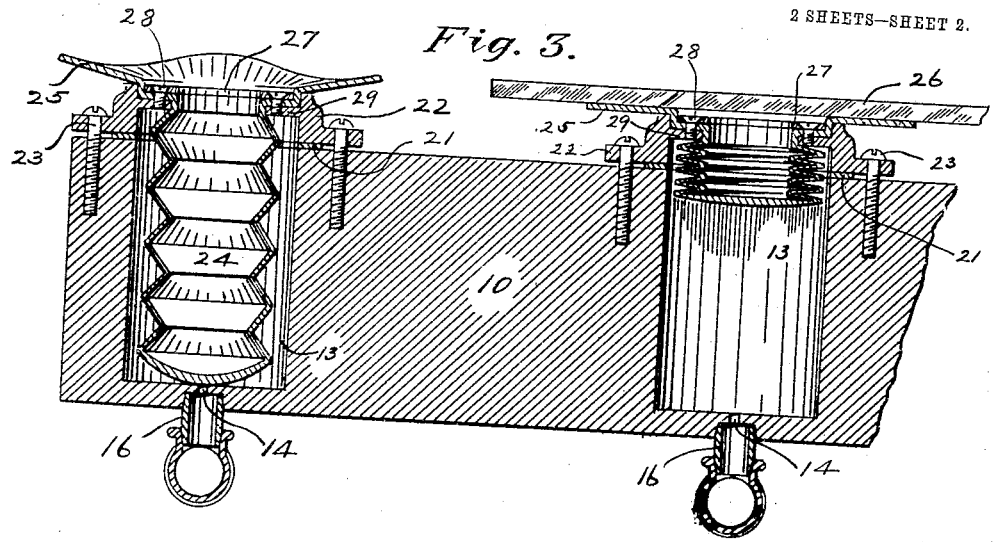
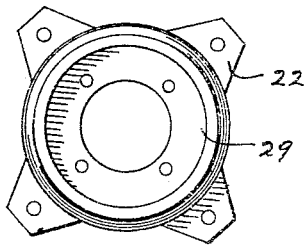
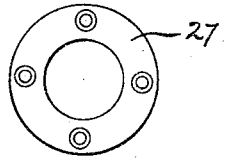
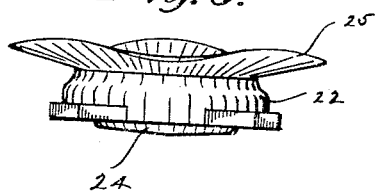
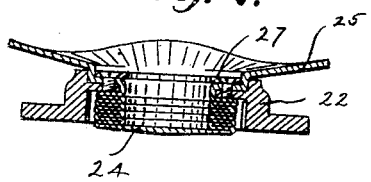

No. 750,667.

Patented January 26, 1904.

UNITED STATES PATENT OFFICE.

OSCAR I. LEWELLYN AND JAMES W. SCHOCK, OF KOKOMO, INDIANA.

VACUUM-FRAME.

SPECIFICATION forming part of Letters Patent No. 750,667, dated January 26, 1904.

Application filed August 24, 1903. Serial No. 170,657. (No model.)

*To all whom it may concern:*

Be it known that we, OSCAR I. LEWELLYN and JAMES W. SCHOCK, citizens of the United States, residing at the city of Kokomo, in the county of Howard and State of Indiana, have invented a new and useful Vacuum-Frame, of which the following is a specification.

Our invention relates to a vacuum-frame adapted to handle sheets of glass and other like things, and especially things of the kind of varying dimensions. To this end a number of suction-holders are employed from which the air may be exhausted by a single means and which are provided with means for automatically and independently closing the suction-holders in the frame that are not in use. These holders are placed upon a frame, and when a sheet of glass, for instance, smaller than the frame is to be picked up and held the holders in contact with the sheet of glass will act to hold the same pneumatically, whereas the exhaust-ports from the other holders will be automatically closed, so that the suction apparatus will be free to act on the holders in contact with the sheet of glass. In this way sheets of glass or the like of any dimensions may be picked up, held, and transported.

The use to which this vacuum-frame is put is chiefly in handling plate-glass for transporting the same or changing its position or holding the glass while the same is being beveled.

The practical means for closing the exhaust-port herein shown is a diaphragm in the suction-holder, which is moved by the incoming outside air against the exhaust-port, so as to close it whenever there is nothing covering or closing the mouth of the suction-holder.

The full nature of this invention will be understood from the accompanying drawings and the following description and claims.

Figure 1:
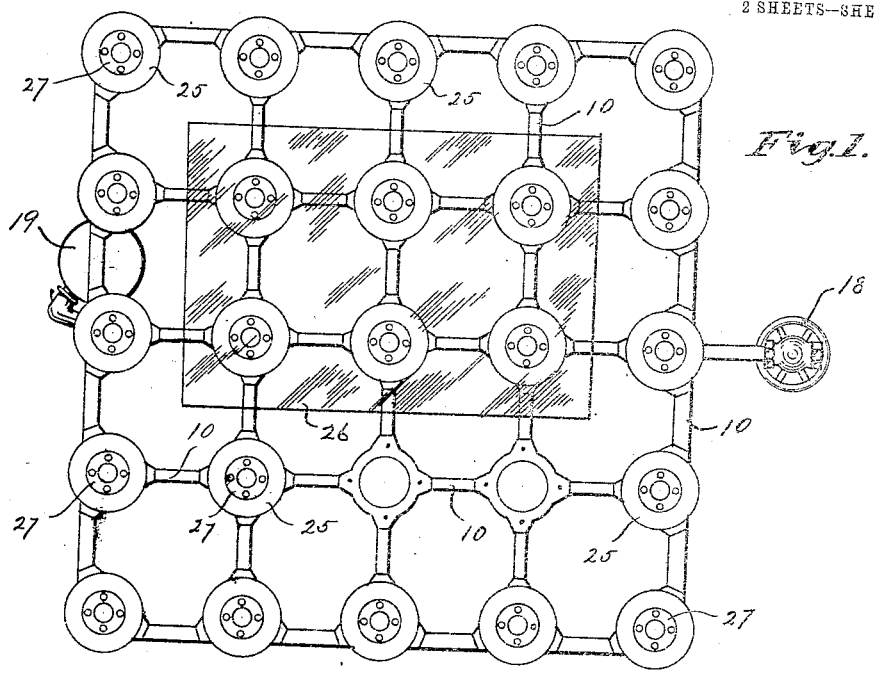
Figure 2:
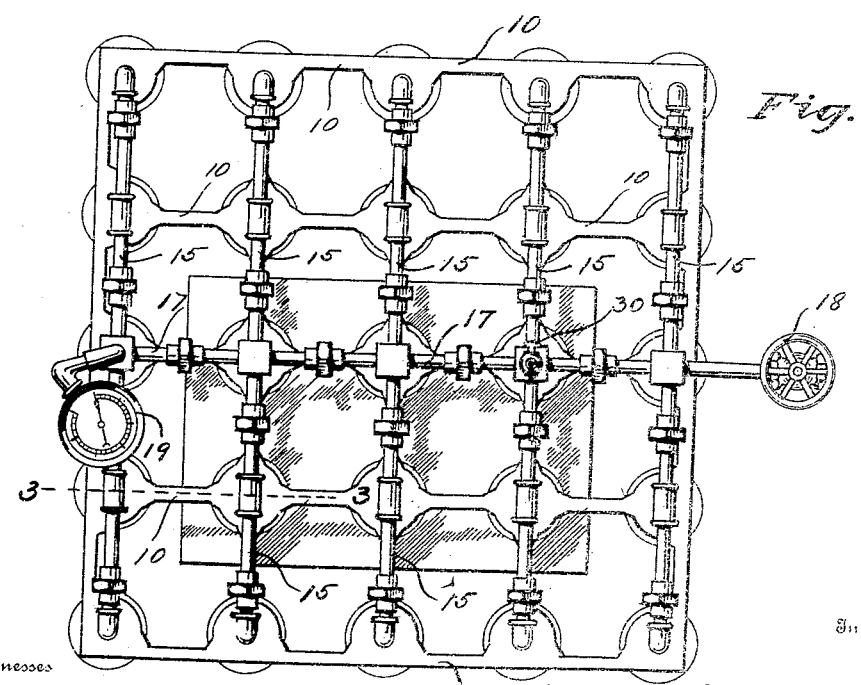

In the drawings, Figure 1 is a front elevation of the vacuum-frame holding a sheet of glass smaller than the frame. Fig. 2 is a rear elevation of what is shown in Fig. 1 as if said Fig. 1 were turned over and inverted. Fig. 3 is a transverse section on the line 3 3 of Fig. 2, showing one suction-holder in use and the other not in use. Fig. 4 is a plan view of a head for a suction-holder. Fig. 5 is a plan view of the ring for holding the mouth of the suction-holder and the diaphragm in place. Fig. 6 is a side elevation of part of a suction-holder and a diaphragm with the latter collapsed. Fig. 7 is a central section of the same.

In detail there is shown herein a rectangular skeleton frame 10, consisting of a number of bars crossing each other at right angles and widened at their intersection to provide places at such intersection for securing the suction-holders. At said intersections there are exhaust-chambers 13, as shown in Fig. 3, with a small exhaust-port 14. A number of pipes or tubes 15 are secured to said frame 10 by short T-joint pipes 16, that are secured to the frame at said intersections, so as to register with the exhaust-ports 14, leading from the chambers 13, as appears plainly in Fig. 3. The series of vertical pipes 15 have connected with them a transverse pipe 17, through which air may be exhausted by any suitable means, such as a vacuum-pump, from the pipes 15 and chambers 13. A valve 18 closes the pipe 17 or regulates the exhaustion of air therethrough.

19 is a vacuum-gage.

It is thus seen that by a single means the air can be exhausted from the chambers 13 at every intersection of the bars constituting the frame 10. The suction-holders are at said intersections of the bars constituting the frame over the mouths of the recesses or chambers 13, as shown in Fig. 3. First a rubber gasket 21 is placed surrounding the mouth of the chamber 13 and on it an annular metal head 22 is clamped by the screws 23. It has secured to it a flaring rubber mouth 25, adapted to press against a plate of glass 26 or the like and when air is exhausted therefrom to hold said plate of glass. Within the exhaust-chamber a bellows-shaped rubber diaphragm 24 is secured. As herein shown, it is secured to the annular head 22, together with the rubber mouth 25, by the ring 27 and screws 28, that screw into an inwardly-extending flange 29 within the annular head. The bellows-shaped diaphragm 24 can be stretched longer than the depth of the chamber 13, as seen in Fig. 3, and when air is exhausted from said chamber 13 outside air acting against the rubber diaphragm 24 will force it back against the inner end of the chamber 13, so as to close the port 14 and prevent further exhaustion of air from the chamber 13 or passage of air from the outside through the port 14 into the exhaust-pipes. Said bellows-shaped diaphragm, however, in its normal condition is collapsed, as shown in Fig. 7. When it is applied to a plate of glass like 26 and air is exhausted from the chamber 13, the diaphragm 24 will lengthen somewhat, as shown at the right hand of Fig. 3, and create such a suction on the plate of glass as to hold it.

The operation of the device is as follows: The frame is applied to a plate of glass and the valve 18 opened, so as to exhaust the air through the pipes 17 and pipes 15 from the chamber 13. If the sheet of glass is as large as the frame, the rubber diaphragm 24 will assume the position shown at the right hand of Fig. 3, and the suction will enable the frame to hold the plate-glass effectually. If, however, the plate of glass is, as shown in Figs. 1 and 2, of smaller dimensions than the vacuum-frame, the rubber diaphragm 24 will stretch out into the position shown in Fig. 3 at the left and close the ports 14, leading from all the chambers 13, having suction-holders not in contact with the glass, whereas the rubber diaphragm when the suction-holder is in contact with the glass will assume the position shown in Fig. 3 at the right. It is obvious that with this arrangement the exhaust or suction may be maintained so as to continue to act upon the sheet of glass, inasmuch as no air can enter the pipes 15 through the suction-holders not in contact with the glass. Hence the diaphragms in the suction-holders not in use when there is an exhaustion of the air automatically closes the ports leading into the exhaust-pipes 15, so that the frame can act through the suction-holders that are in contact with the glass in the same way as if the frame were reduced to a size equal to the sheet of glass being handled.

While the device has been referred to as holding sheets of glass of smaller dimensions than the frame, it is obvious that the device may hold sheets of glass of larger dimensions than the frame. The sheet of glass may be held while the frame is being moved by merely closing the valve 18, and the glass may be released by opening the pet-cock 30 and letting air into the pipes 15 and 17. The device is of great utility in handling plate-glass mechanically instead of by hand.

We do not wish to be limited to any particular form of frame or vaccum-pump or means for exhausting the air or connection of the frame with anything else for handling the frame and moving it into various positions, nor do we wish to be limited to the particular manner of forming the suction-holder or securing the diaphragm therein. "Suction-holder" as herein used means a chamber from which air may be exhausted with a suitable mouthpiece however these two things may be formed. We do not wish to limit ourselves to the union in one piece of rubber of the diaphragm and mouthpiece, as they may be separate and really have no functional connection with each other, nor do we wish to limit ourselves to a construction wherein the diaphragm is secured to the annular head 22, for it may be secured anywhere in the exhaust-chamber, provided that when it is acted upon by the outside air-pressure it will close the exhaust-port 14.

What we claim as our invention, and desire to secure by Letters Patent, is—

1. A vacuum-frame having a plurality of suction-holders, a single means for exhausting air therefrom, and means controlled by the outside air-pressure for stopping the exhaust.

2. A vacuum-frame having a plurality of suction-holders with an exhaust-port leading therefrom, a single means for exhausting air from said suction-holders, and a diaphragm within the suction-holder that is moved by the external air-pressure into a position for closing the exhaust-port.

3. A vacuum-frame having a plurality of exhaust-chambers with a port leading from each, a single means for exhausting the air from said chambers, and a diaphragm in each chamber that is moved by the external air-pressure into a position to close the exhaust-port leading from said chambers when the air is exhausted from said chambers.

4. A vacuum-frame having a plurality of exhaust-chambers with an exhaust-port leading from each, a suitable mouthpiece for each chamber, a single means for exhausting the air from said chambers, and a bellows-shaped diaphragm secured in said chamber with its outer end open and its inner end closed so that the external air-pressure will move the inner end to close the exhaust-port when the air is exhausted from said chambers.

5. A vacuum-frame having a plurality of exhaust-chambers with an exhaust-port leading from each, an annular head secured at the mouth of each chamber, a flexible mouthpiece secured to said annular head, a bellows-shaped diaphragm secured in said chamber to said annular head, and a single means for exhausting air from said chambers.

6. A vacuum-frame formed of a number of bars crossing each other at right angles and widened at their intersection, an exhaust-chamber formed in such widened portion at said points of intersection and having an exhaust-port leading from the inner end thereof, a collapsible mouthpiece secured to the outer end of each exhaust-chamber, a diaphragm in each exhaust-chamber that is moved by the outside air-pressure to close the exhaust-port when the air is exhausted from said chamber, a series of pipes connected with said exhaust-chambers, and a single pipe through which the air may be exhausted from all of said exhaust-chambers through the exhaust-ports and said series of pipes.

In testimony whereof we and each of us have signed our names to this specification in the presence of two subscribing witnesses.

OSCAR I. LEWELLYN.
JAMES W. SCHOCK.

Witnesses:
GEORGE W. DUKE,
SCHUYLER C. MILLS.